United States Patent [19]
Ueki et al.

[11] 3,883,893
[45] May 13, 1975

[54] MAGNETIC TAPE RECORDING AND REPRODUCING APPARATUS

[75] Inventors: Yoshiharu Ueki; Yoshio Maruyama; Yoshihiro Magata; Akihiro Fushimi; Katsuhisa Shimizu, all of Kawagoe, Japan

[73] Assignee: Pioneer Electronic Corporation, Tokyo, Japan

[22] Filed: Mar. 11, 1974

[21] Appl. No.: 450,260

[30] Foreign Application Priority Data

Mar. 9, 1973 Japan ................................ 48-27805

[52] U.S. Cl. ....................... 360/74; 360/71; 360/96; 360/105

[51] Int. Cl. ................... G11b 15/18; G11b 15/44; G11b 23/04

[58] Field of Search ............. 360/74, 71, 75, 69, 96, 360/105; 242/57, 201, 200, 199

[56] References Cited

UNITED STATES PATENTS

| | | | |
|---|---|---|---|
| 3,472,464 | 10/1969 | Morimoto et al. | 360/74 |
| 3,487,392 | 12/1969 | Lewis | 360/74 |
| 3,698,723 | 10/1972 | Kobler et al. | 360/74 |
| 3,730,532 | 5/1973 | Miyamoto | 360/93 |
| 3,784,129 | 1/1974 | Bourgeois | 360/74 |

*Primary Examiner*—Alfred H. Eddleman
*Attorney, Agent, or Firm*—Sughrue, Rothwell, Mion, Zinn & Macpeak

[57] ABSTRACT

A tape recorder utilizing a tape cassette is disclosed which eliminates the tape slack between supply reel and take-up reel. When the tape cassette is placed in the play position, the supply reel is first rotated in the backward direction to remove the tape slack. Then the take-up reel is started to rotate by the stretched tape. A detecting device is provided to detect the rotation of the take-up reel in the backward direction. The detecting device triggers a control device which in turn switches the rotation of the take-up reel and permits pinch roller to engage with capstan to transfer the tape in the forward direction for ordinary performance.

5 Claims, 6 Drawing Figures

MAGNETIC TAPE RECORDING AND REPRODUCING APPARATUS

BACKGROUND OF THE INVENTION

The present invention is in general directed to an improvement of a magnetic recording and reproducing apparatus, and more particularly to a magnetic recording and reproducing apparatus having the function of preventing unstable operation due to the slack of the magnetic tape between supply reel and the take-up reel.

For better understanding of the present invention, some disadvantageous phenomena encountered in the tape recording and reproducing apparatus of prior art due to slack of the magnetic tape will first be studied briefly with reference to FIG. 4 in which a tape recording apparatus of dual capstan type is illustrated.

FIG. 4A shows an example in which slack exists in the tape of supply reel side. In this case, tape tension of a magnetic head side, being bounded by capstans 4, becomes larger than that of the side of the supply reel 2 side, which causes some portion of the magnetic tape 36 to be protruded out of the capstan 4 and pinch roller 34, resulting in twisting or cutting of the tape 36 as well as aggravation of wow-flutter characteristic.

FIG. 4B shows an example in which slack of the tape 36 exists between the capstan 4 and another capstan 4. In this case, tape transport with constant speed may not be obtained, and noises and drop-out of signal due to unstable contact between the tape 36 and the magnetic head 30 will be encountered.

FIG. 4C shows an example in which slack of the tape 36 exists in take-up reel (3) side. In this case, since the take-up reel can not absorb all of slack, the remaining slack portion of the tape to be sent out between the capstan 4 and pinch roller 34 may twist round an other member of the recording apparatus.

Although those examples have been described about the magnetic recording and reproducing apparatus of the dual capstan type, these disadvantageous phenomena may also be encountered in a recording apparatus of the single capstan type. As described above slack of magnetic tape existing before the tape is started to play may deteriorate the performance of such magnetic recording and reproducing apparatus.

In order to avoid such disadvantage as described in connection with the example shown in FIG. 4A, prior art has attempted to increase accuracy of parallelism between capstan and pinch roller. This and other attempts, however, have not been successful as a practical matter.

Accordingly, it is an important object of the present invention to provide an improved magnetic recording and reproducing apparatus in which slack of tape can be eliminated in advance, before the tape is started to play, to obtain stable performance.

The novel features which are considered as characteristic of the present invention are set forth in particular in the appended claim.

DETAILED DESCRIPTION OF EMBODIMENT OF THE INVENTION

Figure 2:
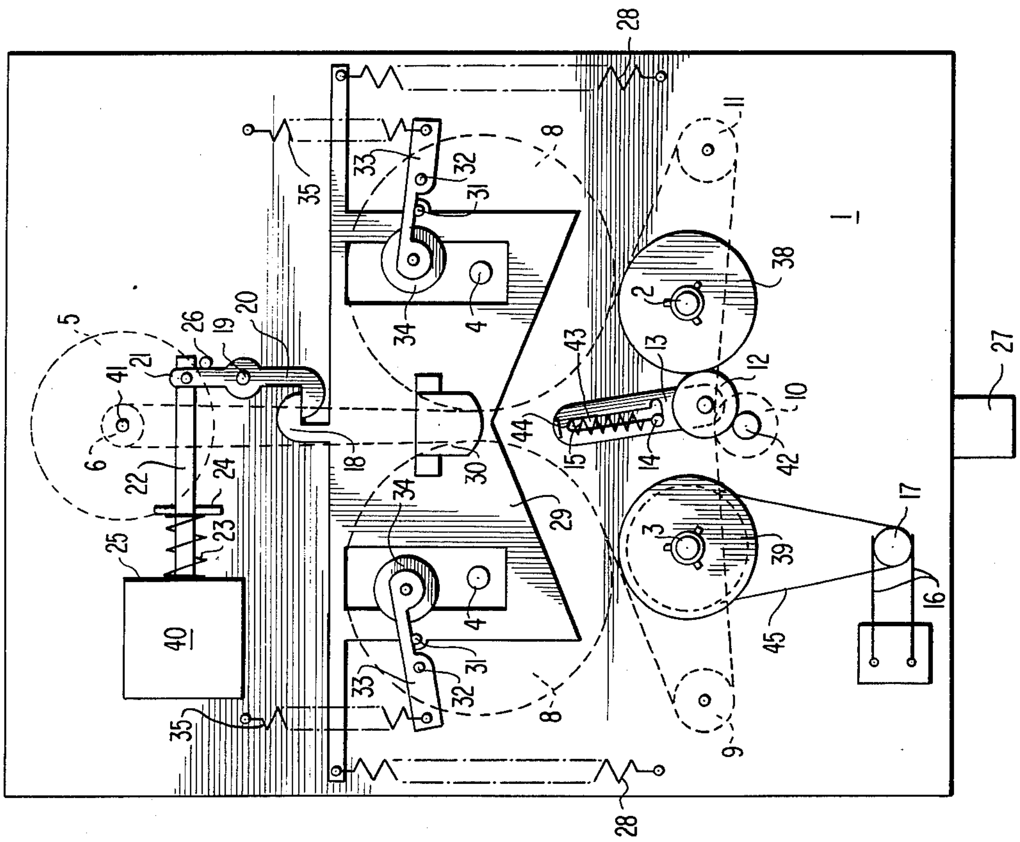
FIG. 2 is a top view showing the internal construction in "non-play" position, which embodies the present invention in a cassette type tape recording apparatus.
Figure 1:
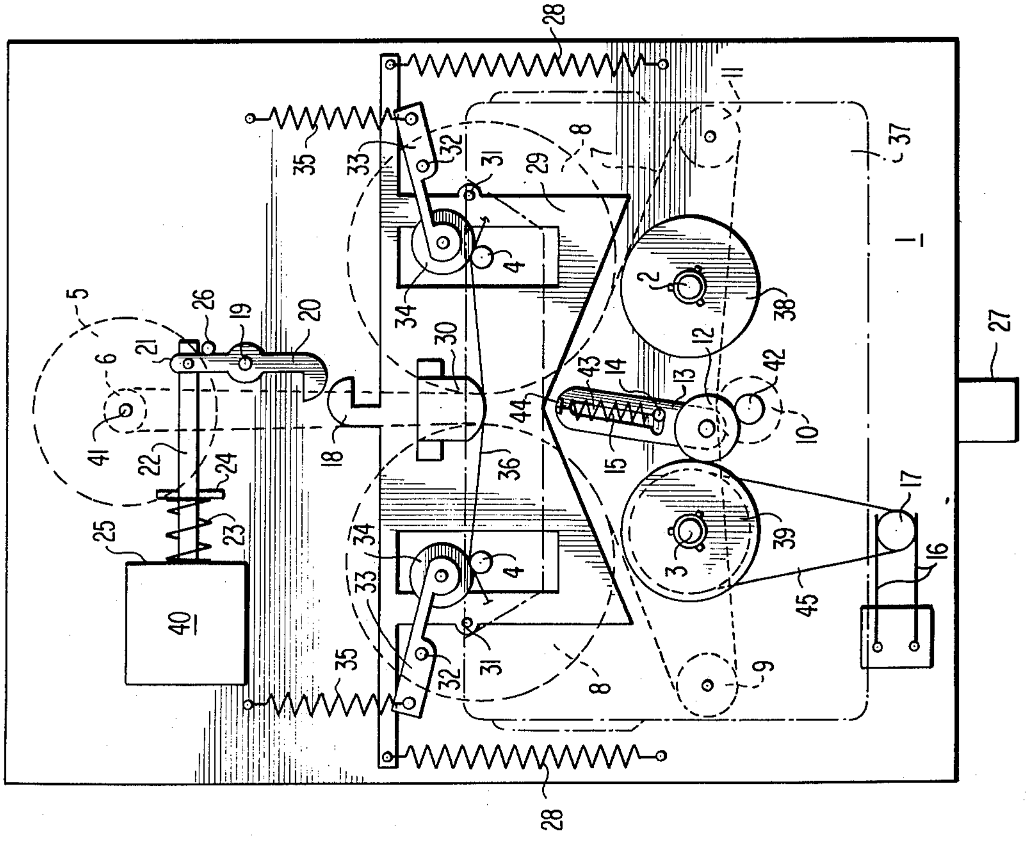
FIG. 1 is a top view showing the internal construction in "play" position, which embodies the present invention in a cassette type tape recording apparatus.

Now referring to FIG. 1 and FIG. 2, in the drawings, reference numeral 1 shows a chassis, on which a pair of reel driving spindles 2, 3 and a pair of capstans 4, 4 are rotatably mounted in a predetermined relation. The chassis 1 also includes a electric motor 5 for driving the reel driving spindles 2, 3 and the capstans 4, 4. An endless belt 7 is provided to pass around motor pulley 6 secured to the rotor shaft of the motor 5, flywheel 8 attached to one of the capstan 4, three pulleys 9, 10, and 11, and flywheel 8 secured to the other capstan 4. Rotating shaft 42 to which the pulley 10 is secured extends upwardly through the chassis 1. An idle pulley 12 is positioned close to the rotating shaft 42, and supported rotatably on one end of a lever 13. The rotating shaft 42 is positioned to be equally spaced from both the reel driving spindles 2 and 3. The lever 13 is held on the chassis 1 by a pin 14 that engages movably with slot 43 thereof. On the other end of the lever 13 there is provided tab portion 44 to which one end of spring 15 is secured. The other end of the spring 15 engages with the pin 14, and the spring serves to press the idle pulley 12 against the rotating shaft 42. The idle pulley 12 is also pressed against supply reel mount 38 or take-up reel mount 39 in accordance with the rotating direction of the rotating shaft 42. Thus, the rotation of the rotating shaft 42 may be transmitted to the take-up reel mount 39 through the idle pulley 12 in ordinary play mode. When the rotation of the motor 5 is reversed, the idle pulley is switched to the supply reel mount to rotate that.

On the other hand, the chassis 1 supports a carriage 29 which is movable between the first position close to the tape cassette placed in play position, as shown in FIG. 1, and the second position spaced from the first position, as shown in FIG. 2, and is biased to be retained in the first position by a spring 28. A magnetic transducer head 30 and a pair of pins 31 are placed on the carriage 29, and each pin 31 is positioned to abut on the free end of supporting frame 33 which is pivotably mounted on shaft 32 on the chassis 1. The supporting frame 33 holds rotatably pinch roller 34, and is biased by spring 35 so that the pinch roller 34 approches to the capstan 4. The pin 31 abutting on the supporting frame 33 permits the supporting frame 33 to rotate so as to press the pinch roller 34 against the capstan 4 when the carriage 29 is in the first position shown in FIG. 1, and serves to rotate the supporting frame 33 against the spring 35 so as to separate the pinch roller 34 from the capstan 4 in the process in which the carriage is shifted from the first position to the second position.

In order to release the carriage, there is provided ejection button 27. By depressing the ejection button 27, a rod (not shown in the drawings) shifts the carriage 29, and a rockable member 18 attached to the carriage 29 engages with a rockable retaining lever 20 rotatably supported on the chassis 1 by a shaft 19, thereby causing the carriage 29 to be retained in the position shown in FIG. 2. The other end of the rockable retaining lever 20 is connected to plunger 22 of an electro-magnet 40 through a pin 21. A compression spring 23 is provided between the front wall 25 of the electro-magnet 40 and a stopping member 24 secured to the plunger 22, which serves to rotate the rockable retaining lever 20 around the shaft 19 in the clockwise direction. However the rockable retaining lever 20 is blocked to rotate by a stopper pin 26 secured to the chassis 1.

A sensing rotor which is connected to the take-up reel mount 39 through a belt 45 is provided to detect when the take-up reel mount is rotated in the rewind or backward direction. The sensing rotor is provided with electric conducting portion partly around the peripheral surface thereof so as to short-circuit a pair of sensing members 16, 16 when it rotates.

Figure 3:
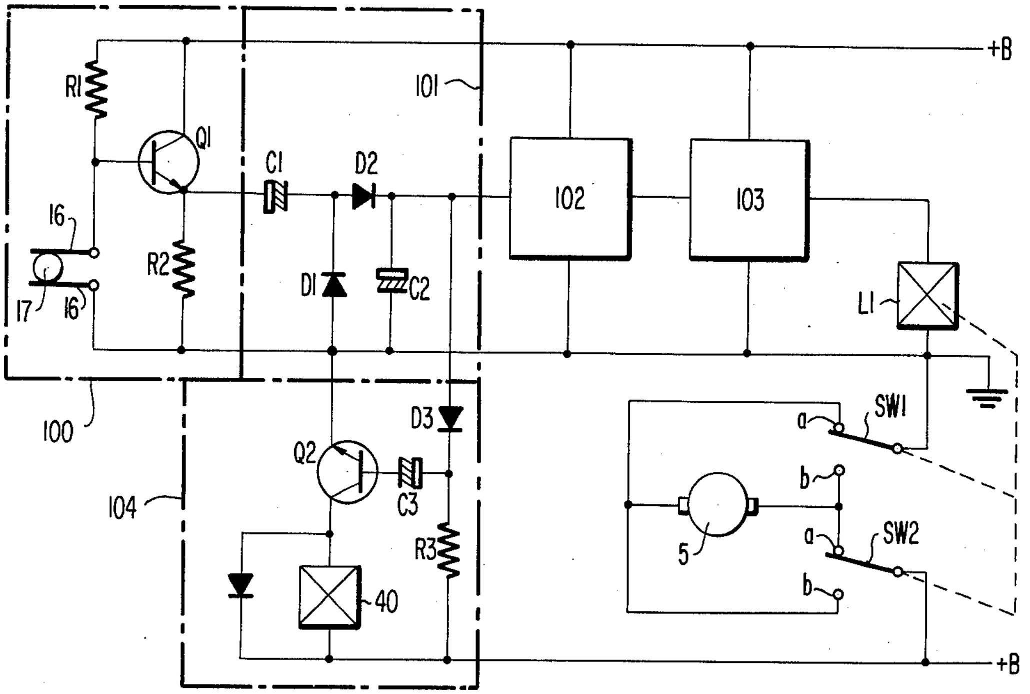
FIG. 3 is a circuit diagram of a control device for the apparatus shown in FIG. 1 and FIG. 2, and FIGS. 4A–4C show diagrams for several conditions in which tape slack is generated in prior art devices.
Figure 4A:
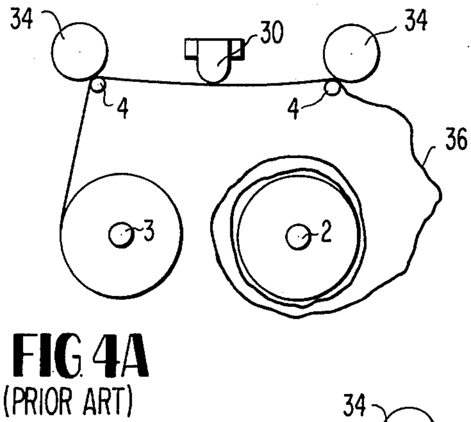
FIG 4A (PRIOR ART)
Figure 4B:
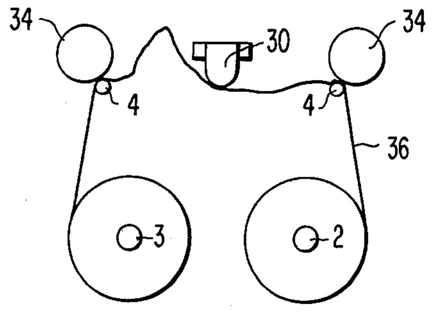
FIG 4B (PRIOR ART)
Figure 4C:
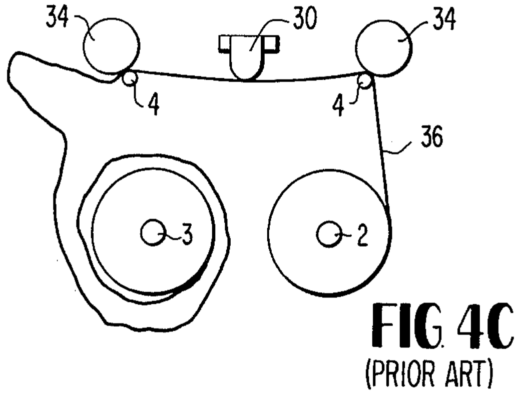
FIG 4C (PRIOR ART)

Referring now to FIG. 3, a control circuit for the apparatus will be described below.

A pulse signal detecting circuit 100 comprises a transistor Q1, to the base of which one end of a biasing resistor R1 and one of the sensing member 16 of the sensing rotor 17 are connected. The other end of the biasing resistor R1 is connected to the power supply and another sensing member 16 is grounded. A voltage doubling rectifying circuit 101 includes condensers C1, C2 and diodes D1, D2. The emitter of the transistor Q1 in the pulse signal detecting circuit 100 is coupled to one end of the capacitor C1 in the voltage doubling rectifying circuit 101. the output, that is the cathode of the diode D2 is coupled to the input of a Schmitt trigger circuit 102 and also to the anode of a diode D3 in plunger control circuit 104. The Schmitt trigger circuit 102 is constructed so as to switch its state when a signal having higher level than a predetermind level is applied and generate negative or positive pulse in turn. Output pulse from the Schmitt trigger circuit 102 is applied to a flip-flop circuit 103, output signal of which will control relay L1. The relay L1 serves as reversing means for a double-pole double-throw switch SW1 which permits the motor to rotate either in the forward and backward direction. The relay L1 controls the switch SW1 so that the motor is always rotated in the backward direction when a tape cassette is newly loaded to the apparatus.

The plunger control circuit 104 includes a transistor Q2, diode D3, condenser C3 and resistor R3, the cathode of the diode D3 and the one end of the resistor R3 having the other end grounded are connected to one end of the condenser C3. The other end of the condenser C3 is coupled to the base of the transistor Q2, and the collector thereof is connected to the power supply through the electro-magnet 40. The emitter of the transistor Q2 is grounded.

The operation of the recording and reproducing apparatus constructed as disclosed above will now be described.

When a tape cassette is placed in the predetermined position, an electric switch (not shown in the drawings) is closed to cause the motor 5 to rotate in the backward direction. With the rotation of the motor 5, the flywheels 8, 8, and the pulleys 9, 10 and 11 start to rotate. The idle roller 12 abutting on the rotating shaft 42 is pressed against the supply reel mount 38 in accordance with the rotating direction of the rotating shaft 42. Thus, the rotation of the shaft 42 can be transmitted to the supply reel mount 38 through the idle roller 12. In this condition, if there is tape slack between the take-up reel and the supply reel, the reel driving spindle

2 for the supply reel will continue to rotate until the tape slack is eliminated. When the tape slack is removed completely and the supply reel continues to rotate, the take-up reel starts to rotate, resulting in rotation of the reel driving spindle 3 in the backward direction. Thus, the sensing rotor 17 connected with the belt 45 to the reel driving spindle 3 will rotate. By the rotation of the sensing rotor 17, the sensing member 16, 16 are short-circuited intermittently to generate pulse signal. Generation of the pulse signal is the indication of completion of tape slack removal. The pulse signal generated in the detecting circuit 100 is applied to the voltage doubling rectifying circuit 101, the output D.C. voltage signal is applied both to the Schmitt trigger circuit 102 and the plunger control circuit 104. The output signal from the Schmitt trigger circuit 102 cause the flip-flop circuit 103 to switch into the reversed state. This flip-flop circuit 103 serves to reverse the two-pole two-throw switch SW1 from the (a) side position to (b) side position, shown in FIG. 3, by way of the relay L1 so as to actuate the motor 5 to rotate in the forward direction. Thus, the idle roller 12 disengages with the supply reel mount 38 and comes into contact with the take-up reel mount 39 with continuing to engage with the rotating shaft 42. The rotation of the rotating shaft 42 is transmitted to the take-up reel mount 39 to rotate that.

The output signal applied to the plunger control circuit 104 will actuate the electro-magnet 40, which draws the plunger 22 thereto, and thereby rotating the rockable retaining lever 20 in the anti-clockwise direction around the shaft 19 secured to the chassis 1 so as to release the rockable member 18. Accordingly the carriage 29 will be released from the rocked condition and shifted to the first position shown in FIG. 1 by the action of the spring 28. Thus, the magnetic head 30 comes in engagement with the tape in the cassette already placed in position through the aperture thereof, while the supporting frame 33 is released from blocking by the pin 31 and the pinch roller 34 is pressed against the capstan 4. In this state, the tape 36 is sandwiched between the capstan 4 and the pinch roller 34, and the tape thereby being transferred from the supply reel to the take-up reel at a predetermined speed in the forward direction. While the condenser C3 is being charged, the transistor Q2 is maintained in ON state. With accomplishment of charging the transistor Q2 is tured into OFF state, and the electro-magnet 40 is de-energized. The plunger 22 is pushed forwards by the spring 23 so as to ture the rockable retaining lever 20 to the original position.

Thus, the present invention prevent the magnetic tape from the damage of curling or cutting due to the tape slack and accomplishes stable transport of the tape.

Although the present invention has been described with respect to a certain specific embodiment, it will be appreciated that modifications and changes may be made by those skilled in the art without departing from the true spirit and scope of the invention. In particular, the present invention may be applied not only to a recording and reproducing apparatus of the dual capstan type, but also to a recording and reproducing apparatus of single capstan type.

What is claimed and desired to be secured by Letters Patent of the United States is:

1. In a casette tape recording and reproducing device of the type having rotatable supply and take-up spindles to engage the supply and take-up reels in the casette, at least one capstan tape driving means, at least one pinch roller selectably engageable with said capstan, a motor driven means to rotate said at least one capstan, and a moveable carriage to bring said pinch rollers into contact with said capstan and the transducer head into contact with the tape, the improvements comprising:

a. means to rotate said supply spindle in a rewind direction, by running the motor in the reverse direction, b. means for sensing rotation of the take-up spindle in the rewind direction, c. means responsive to said sensing means to change the direction of the motor to the forward direction, and to move the carriage so as to engage the transducer head with the tape and bring said at least one pinch roller into contact with said at least one capstan to provide a driving movement to the tape.

2. The improved casette tape recording and reproducing device of claim 1 wherein the sensing means comprises:

a. pulse generator means driven by said take-up spindle, b. isolation means connected to said pulse generating means, c. rectifying means connected to said isolation means, and d. threshold means responsive to the output of said rectifying means.

3. The improved casette tape recording and reproducing device of claim 2 wherein said threshold means is a Schmitt trigger.

4. The improved cassette tape recording and reproducing device of claim 2 wherein said means responsive to said sensing means comprises:

a. switch means responsive to the output of said threshold means to change the direction of the motor, and b. carriage control means responsive to the output of said rectifying means.

5. The improved casette tape recording and reproducing device of claim 4 wherein said carriage control means comprises:

a. switch means connected to the output of said rectifying means, b. a solenoid electrically connected to said switch means, the plunger of said solenoid mechanically connected to a first hook, pivoted to a stationary support structure, c. a second hook rigidly attached to said moveable carriage, said second hook engaging said first hook at one extremity of the carriage travel, and d. spring means attached to said moveable carriage and a stationary support structure to normally bias said carriage away from said first hook.

* * * * *